(12) United States Patent
Kato

(10) Patent No.: US 8,908,215 B2
(45) Date of Patent: Dec. 9, 2014

(54) IMAGE FORMING SYSTEM, PAPER SHEET PROCESSING APPARATUS AND METHOD FOR CONTROLLING PAPER SHEET PROCESSING

(71) Applicant: Konica Minolta, Inc., Chiyoda-ku, Tokyo (JP)

(72) Inventor: Norishige Kato, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/104,946

(22) Filed: Dec. 12, 2013

(65) Prior Publication Data

US 2014/0168701 A1   Jun. 19, 2014

(30) Foreign Application Priority Data

Dec. 18, 2012   (JP) ................................. 2012-276026

(51) Int. Cl.
| | |
|---|---|
| *G06F 3/12* | (2006.01) |
| *B65H 7/20* | (2006.01) |
| *B65H 1/00* | (2006.01) |
| *B65H 3/44* | (2006.01) |
| *B65H 31/24* | (2006.01) |
| *H04N 1/00* | (2006.01) |
| *B65H 29/60* | (2006.01) |
| *B65H 39/115* | (2006.01) |
| *B65H 43/00* | (2006.01) |
| *G03G 15/00* | (2006.01) |

(52) U.S. Cl.
CPC .. *B65H 7/20* (2013.01); *B65H 1/00* (2013.01); *B65H 3/44* (2013.01); *B65H 31/24* (2013.01); *H04N 1/00411* (2013.01); *B65H 29/60* (2013.01); *B65H 39/115* (2013.01); *B65H 43/00* (2013.01); *G03G 15/6538* (2013.01); *B65H 2301/4318* (2013.01); *B65H 2301/4451* (2013.01); *B65H 2511/40* (2013.01); *B65H 2511/528* (2013.01); *B65H 2513/42* (2013.01); *B65H 2601/11* (2013.01); *B65H 2601/511* (2013.01); *B65H 2801/27* (2013.01)

USPC .......... 358/1.15; 358/1.13; 358/1.14; 399/16; 399/18; 399/20; 399/397; 399/405

(58) Field of Classification Search
USPC .......... 358/1.12, 1.13, 1.14, 1.15; 399/16, 18, 399/19, 20, 21, 23, 365, 367, 368, 369, 372, 399/373, 393, 394, 397, 405
See application file for complete search history.

(56) References Cited

U.S. PATENT DOCUMENTS 5,995,773 A * 11/1999 Awano ............................. 399/21
7,651,081 B2 * 1/2010 Yokobori et al. .......... 270/58.23
7,862,029 B2 * 1/2011 Yokobori et al. ............ 271/3.14

FOREIGN PATENT DOCUMENTS

| JP | 11-292389 A | 10/1999 |
|---|---|---|
| JP | 2003-280304 A | 10/2003 |
| JP | 2003-280305 A | 10/2003 |
| JP | 2007-076850 A | 3/2007 |
| JP | 2011-063398 A | 3/2011 |

* cited by examiner

*Primary Examiner* — Vu B Hang
(74) *Attorney, Agent, or Firm* — Holtz, Holtz, Goodman & Chick PC

(57) ABSTRACT

When implementing a purge processing for collecting a retention paper sheet remaining within an image forming system so as to eject the collected retention paper sheet to a plurality of paper sheet ejecting trays of a paper sheet ejecting section, based on paper sheet information regarding a paper sheet feeding tray from which each of the retention paper sheets is fed, a control section controls the paper sheet ejecting section so as to eject the retention paper sheets onto the plurality of paper sheet ejecting trays, in such a manner that a first retention paper sheet fed from a specific paper-sheet feeding tray is ejected separately from a second retention paper sheet fed from a paper sheet feeding tray other than the specific paper-sheet feeding tray.

20 Claims, 10 Drawing Sheets

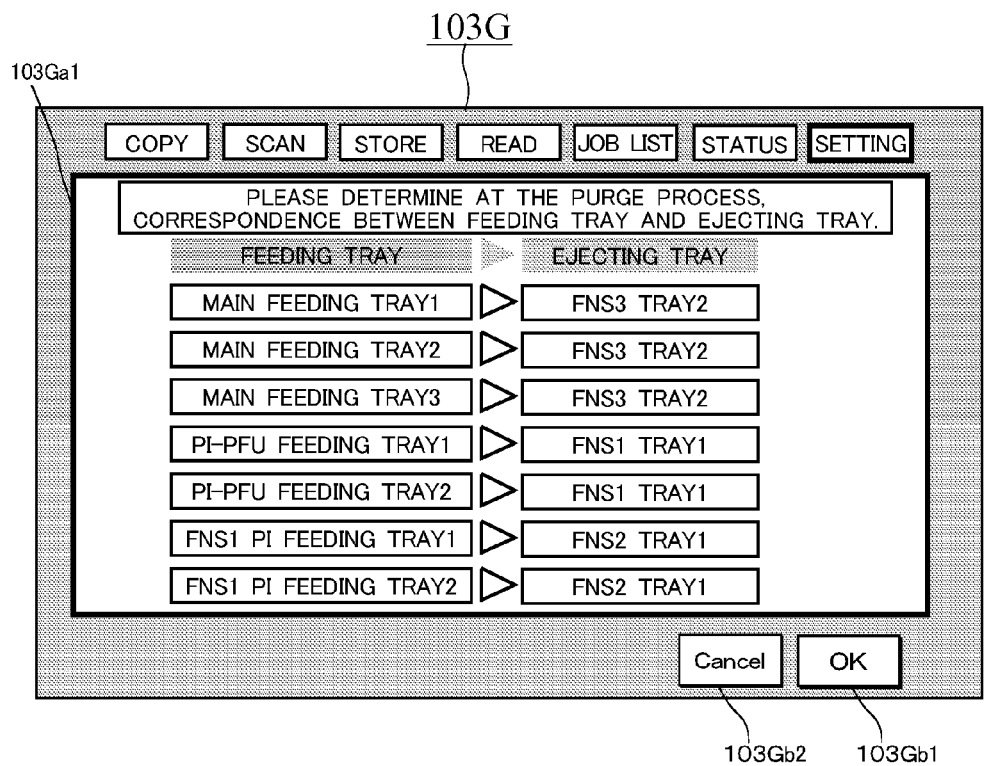

| PAPER SHEET ID NUMBER | 1 |
|---|---|
| PAPER SHEET SIZE [WIDTH] INFORMATION | 297mm |
| PAPER SHEET SIZE [LENGTH] INFORMATION | 210mm |
| PAPER SHEET SIZE [WEIGHT] INFORMATION | 60g/m² |
| EJECTING TRAY INFORMATION | EJECTING TRAY in FNS2 |
| PROCESSING MODE INFORMATION | PUNCHING |
| FEEDING TRAY INFORMATION | FEEDING TRAY 1 in PI |

IMAGE FORMING SYSTEM, PAPER SHEET PROCESSING APPARATUS AND METHOD FOR CONTROLLING PAPER SHEET PROCESSING

This application claims priority under 35 U.S.C. §119 to Japanese Patent Application No. 2012-276026 filed on Dec. 18, 2012, the entire disclosure of which is incorporated herein by reference in its entirety.

BACKGROUND OF THE INVENTION

1. Field of the Invention

The present invention relates to an image forming system in which a paper sheet processing apparatus is coupled to an image forming apparatus, a paper sheet processing apparatus which is to be employed in an image forming system, or a technique for appropriately ejecting retention paper sheets remaining in the apparatus, in a method of controlling a paper sheet processing, which is to be employed in the image forming system and the paper sheet processing apparatus.

2. Description of Related Art

The following description sets forth the inventor's knowledge of related art and should not be construed as an admission of knowledge in the prior art.

Generally speaking, in order to cope with various kinds of printing conditions, an image forming apparatus, such as a printer or a copier, etc., employing a laser or the like, is provided with a plurality of paper-sheet feeding trays, which respectively accommodate plural kinds of paper sheets and respectively corresponds to the plural kinds of paper sheets. Further, as one of the paper-sheet feeding trays above-mentioned, there has also existed such an image forming system that is provided with a paper sheet feeding section from which an insertion paper sheet is to be inserted and which is located at a downstream position from the image forming section. Still further, in order to separately handle each of paper sheets onto which a huge variety of images are printed, sometimes, the image forming system has been configured by coupling various kinds of paper sheet processing apparatuses to an image forming apparatus. Then, in the above-mentioned case where the various kinds of paper sheet processing apparatuses are coupled to an image forming apparatus, a plurality of paper sheet ejecting trays, each of which is in conformity with a corresponding one of the various kinds of paper sheet processing, may be provided therein.

In this connection, there exists such a technology that, when a paper jam occurs at any one of the positions in the image forming system, after deactivating the operations currently performed in the image forming system, retention paper sheets, remaining within the image forming system concerned, are collected into a paper sheet ejecting tray located at one place so as to collectively eject them outside the image forming system. In this connection, this kind of an operation for ejecting the retention paper sheets is called a purge processing.

In this connection, with respect to an operation for handling retention paper sheets at the time when a paper jam occurs, each of Japanese Patent Application Laid-Open Publication 2007-76850, Japanese Patent Application Laid-Open Publication 2003-280305, Japanese Patent Application Laid-Open Publication 2003-280304, Japanese Patent Application Laid-Open Publication Hei-11-292389 and Japanese Patent Application Laid-Open Publication 2011-63398 sets forth various kinds of the related technologies.

Japanese Patent Application Laid-Open Publication 2007-76850 above-cited proposes that, when a paper jam occurs in the apparatus for handling insertion paper sheets, the insertion paper sheet is ejected outside the inserting device by employing an inversion unit. However, the above-cited Patent Publication fails to disclose such a technical concept that a specific paper sheet or a paper sheet fed from a specific paper-sheet feeding tray is to be separated from another paper sheet, and then, is ejected outside separately from the other paper sheet.

Further, Japanese Patent Application Laid-Open Publication 2003-280305 above-cited proposes that, when a jam of the insertion paper sheet occurs, instead of making an instantaneous decision, after a transfer sheet has been ejected from the image forming apparatus, the image forming apparatus is deactivated due to the jam occurrence. However, the processing for ejecting the retention paper sheet remaining in the image forming apparatus is not considered in the above-cited Patent Publication. In addition, the above-cited Patent Publication also fails to disclose such a technical concept that a specific paper sheet or a paper sheet fed from a specific paper-sheet feeding tray is to be separated from another paper sheet, and then, is ejected outside separately from the other paper sheet.

Still further, Japanese Patent Application Laid-Open Publication 2003-280304 above-cited sets forth that, when a paper jam occurs within the main body of the image forming apparatus and if the position of the paper jam occurrence is located at an upstream side from the meeting point at which the insertion paper sheet is to be inserted, after the insertion paper sheet has been ejected, the operations of the image forming apparatus are deactivated. However, the processing for ejecting the retention paper sheet remaining in the image forming apparatus is not considered in the above-cited Patent Publication. In addition, the above-cited Patent Publication also fails to disclose such a technical concept that a specific paper sheet or a paper sheet fed from a specific paper-sheet feeding tray is to be separated from another paper sheet, and then, is ejected outside separately from the other paper sheet.

Still further, Japanese Patent Application Laid-Open Publication Hei-11-292389 above-cited proposes as a purge processing that, when a paper jam occurs at any one of the positions in the image forming system, retention paper sheets, remaining within an image forming system, are collected into a paper sheet ejecting tray located at one of selectable places so as to collectively eject them outside the image forming system. However, the above-cited Patent Publication also fails to disclose such a technical concept that a specific paper sheet or a paper sheet fed from a specific paper-sheet feeding tray is to be separated from another paper sheet, and then, is ejected outside separately from the other paper sheet.

Still further, Japanese Patent Application Laid-Open Publication 2011-280305 above-cited proposes as a purge processing that, when a paper jam occurs at any one of the positions in the image forming system, the retention paper sheets, remaining within an image forming system, are separated from each other, according to the current state thereof (unprinted, single side printing, duplex printing, etc.), and then, are ejected outside. However, the above-cited Patent Publication also fails to disclose such a technical concept that a specific paper sheet or a paper sheet fed from a specific paper-sheet feeding tray is to be separated from another paper sheet, and then, is ejected outside separately from the other paper sheet.

Yet further, according to the technology set forth in every one of the above-cited Patent Publications, it becomes possible to automatically eject paper sheets in a certain mode by resuming the paper sheet conveying operation after the paper jam has occurred. Then, generally speaking, the above-ejected paper sheets are wasted in a lump.

In the meantime, due to a demand on a final outputted product, sometimes, there would be conducted an operation for inserting an insertion paper sheet through a gap of the final ejection tray located at a downstream position from the image forming apparatus.

Different from a normal paper sheet, sometimes, the above-mentioned insertion paper sheet, such as a pigment coated paper sheet, a gloss paper sheet, a lezac paper sheet, etc., may be very expensive. In addition, since the above-mentioned insertion paper sheet has not received any heat irradiated from the fixing section, it can be reused.

However, according to the technology set forth in every one of the above-cited Patent Publications, since the insertion paper sheet is ejected outside in such a state that the insertion paper sheet is mingled in the paper sheets to be wasted, it has been necessary for the user to find the insertion paper sheet from the paper sheets so as to take out the insertion paper sheet concerned.

Further, since both the insertion paper sheet to be reused and the other normal paper sheets to be wasted are ejected onto a tray allotted to the purge processing use in a lump, in such a case that the insertion paper sheet contacts a paper sheet onto which an unfixed toner image is already transferred, the insertion paper sheet is possibly contaminated with the unfixed toner to such an extent that the insertion paper sheet concerned cannot be reused.

SUMMARY OF THE INVENTION

In general, according to one aspect of the present invention, the image forming system includes a paper sheet feeding section that includes a plurality of paper sheet feeding trays respectively accommodating paper sheets therein, an image forming section that forms an image onto the paper sheet fed from the paper sheet feeding section, a paper sheet ejecting section that ejects the paper sheets onto a plurality of paper sheet ejecting trays, and a control section configured to control the paper sheet feeding section so as to feed the paper sheets to the image forming section from the paper sheet feeding section, to control the image forming section so as to form the image onto the paper sheet, and to control the paper sheet ejecting section to eject the paper sheet onto any one of the plurality of paper sheet ejecting frays of the paper sheet ejecting section, wherein, when implementing a purge processing for collecting a retention paper sheet remaining within the image forming system and ejecting the collected retention paper sheet to the paper sheet ejecting tray, based on paper sheet information regarding the paper sheet feeding tray from which each of the retention paper sheets is fed, the control section is configured to control the paper sheet ejecting section so as to eject the retention paper sheets onto the plurality of paper sheet ejecting trays, in such a manner that a first retention paper sheet fed from a specific paper-sheet feeding tray is ejected separately from a second retention paper sheet fed from a paper sheet feeding tray other than the specific paper-sheet feeding tray.

BRIEF DESCRIPTION OF THE DRAWINGS

One or more embodiments of the present invention are shown by way of example, and not limitation, in the accompanying figures, in which:

FIG. 7 is an explanatory schematic diagram indicating a screen display of an image forming system in accordance with an embodiment of the present invention.

FIG. 8 is an explanatory schematic diagram indicating contents of data to be used in an image forming system in accordance with an embodiment of the present invention.

DETAILED DESCRIPTION OF THE PREFERRED EMBODIMENT

Figure 1:
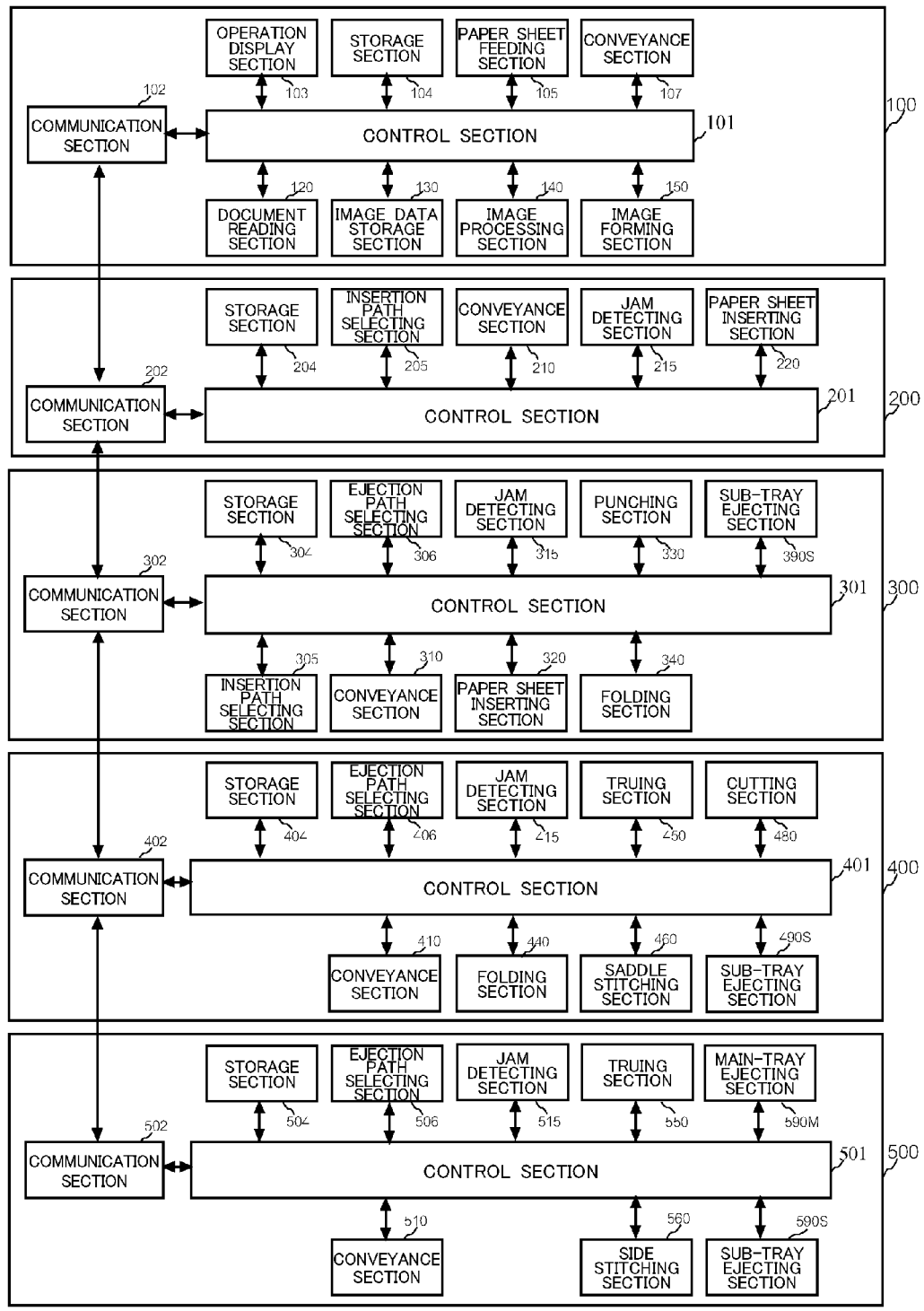
FIG. 1 is a block diagram showing an overall configuration of an image forming system in accordance with an embodiment of the present invention.

In the following paragraphs, one or more embodiments of the invention will be described by way of example and not limitation. It should be understood based on this disclosure that various other modifications can be made by those in the art based on these illustrated embodiments.

Referring to the drawings, one or more embodiments in accordance with the present invention (hereinafter, referred to as an embodiment) will be detailed in the following.
<Overall Configuration>

Figure 2:
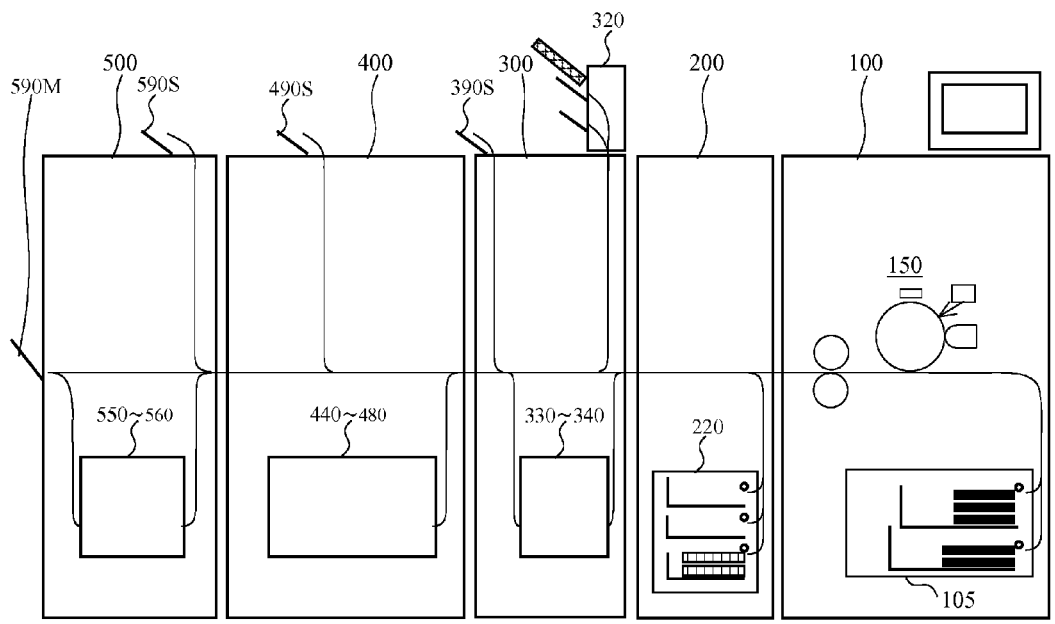
FIG. 2 is a schematic diagram showing a configuration of an image forming system in accordance with an embodiment of the present invention.
Figure 3:
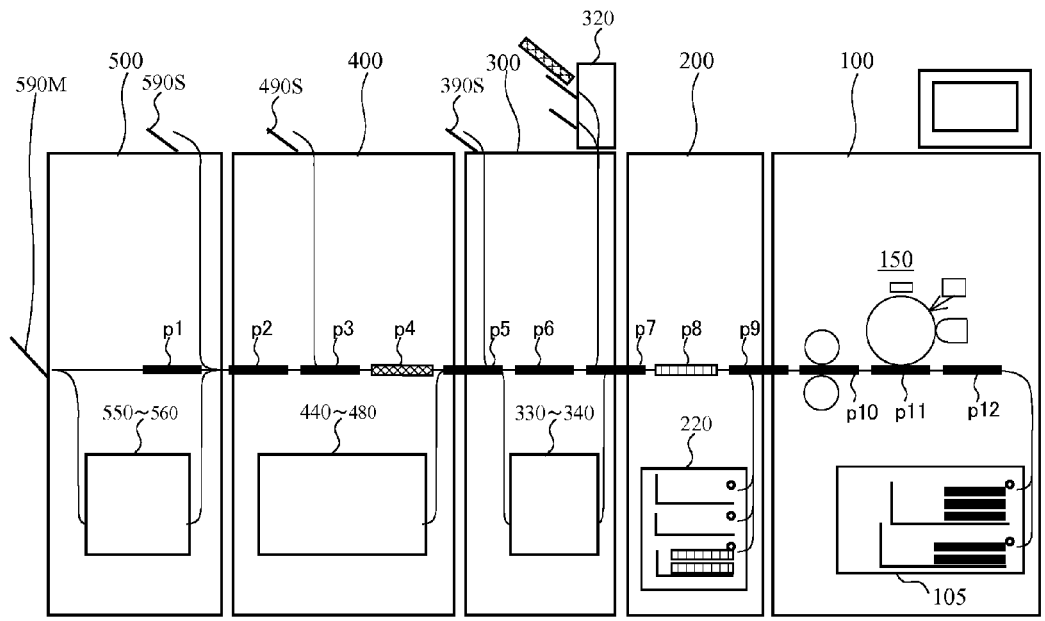
FIG. 3 is a schematic diagram showing a configuration and an operating status of an image forming system in accordance with an embodiment of the present invention.

Referring to FIG. 1 through FIG. 3, a configuration of an image forming system provided with an image forming apparatus and a paper sheet processing apparatuses, both of which are in accordance with an embodiment of the present invention, will be detailed in the following.

As indicated in the schematic diagrams shown in FIG. 1 through FIG. 3, the image forming system is constituted by coupling an image forming apparatus 100, an insertion paper-sheet inserting apparatus 200, a paper sheet processing apparatus 300, another paper sheet processing apparatus 400 and still another paper sheet processing apparatus 500 to each other.

In this connection, the insertion paper-sheet inserting apparatus 200 has a function for inserting an insertion paper sheet at the later stage of the image forming apparatus 100, so as to serve as a PI-PFU (Paper Insert-Paper Feed Unit). The paper sheet processing apparatus 300 is provided with an insertion paper sheet inserting function and a paper sheet processing function. The paper sheet processing apparatus 400 is provided with a paper sheet processing function. The paper sheet processing apparatus 500 is provided with a paper sheet processing function. Incidentally, the above-mentioned mode for coupling the concerned apparatuses to each other in the image forming system is merely an exemplified mode among various kinds of connection modes. Therefore, the scope of the present invention is not limited to the connection mode indicated by the drawings.

The image forming apparatus 100 is provided with a control section 101, a communication section 102, an operation display section 103, a storage section 104, a paper sheet feeding section 105, a conveyance section 107, a document reading section 120, an image data storage section 130, an image processing section 140 and an image forming section 150. In this connection, the paper sheet, onto which an image is formed by the image forming apparatus 100, is conveyed out towards the insertion paper-sheet inserting apparatus 200 serving as the successive stage thereof.

The control section 101 controls not only operations to be performed by the various kinds of sections within the image forming apparatus 100, but also overall operations to be implemented in the system as a whole, serving as the paper sheet processing apparatus. The communication section 102 has a function for communicating with the other apparatuses currently coupled thereto. The operation display section 103 notifies the control section 101 of operation input signals generated corresponding to inputting operations performed by the operator, and displays current statuses of the image forming apparatus 100. The storage section 104 stores control programs and various kinds of setting data therein, and is used as a working area for executing the control programs. The paper sheet feeding section 105 feeds a paper sheet accommodated in the paper sheet feeding tray. The conveyance section 107 conveys the paper sheet, fed from the paper sheet feeding tray, or a paper sheet to be employed for an image forming operation, at a predetermined velocity. The document reading section 120 generates image data by scanning a document. The image data storage section 130 stores image data and various kinds of data, both to be used on an occasion of performing an image forming operation. The image processing section 140 implements various kinds of image processing necessary for the image forming operation. Based on image forming commands and processed image data acquired by applying the image processing to the image data, the image forming section 150 implements a printing operation (hereinafter, referred to as an "image forming operation").

The insertion paper-sheet inserting apparatus 200 is coupled to the image forming apparatus 100 as a successive stage of the image forming apparatus 100, and is provided with: a control section 201 that controls various kinds of sections provided in the insertion paper-sheet inserting apparatus 200; a communication section 202 for communicating with the image forming apparatus 100; a storage section 204 that stores control programs and various kinds of setting data and is to be used as a working area for executing the control programs; an insertion path selecting section 205 that selects an insertion path through which the insertion paper sheet is to be inserted; a conveyance section 210 that conveys the paper sheet at a predetermined velocity; a jam detecting section 215 that detects a paper jam by employing sensors respectively disposed at various positions within the insertion paper-sheet inserting apparatus 200; and a paper sheet inserting section 220 that inserts an insertion paper sheet accommodated therein. In this connection, the paper sheets conveyed through the insertion paper-sheet inserting apparatus 200 is conveyed out towards the paper sheet processing apparatus 300 serving as a successive stage thereof.

The paper sheet processing apparatus 300 is coupled to the insertion paper-sheet inserting apparatus 200 as a successive stage thereof, and is provided with: a control section 301; a communication section 302; a storage section 304; an insertion path selecting section 305; an ejection path selecting section 306; a conveyance section 310; a jam detecting section 315; a paper sheet inserting section 320; a punching section 330; a folding section 340; and a sub-tray ejecting section 390S. In this connection, the paper sheets conveyed through the paper sheet processing apparatus 300 is conveyed out towards the paper sheet processing apparatus 400 serving as a successive stage thereof.

In this connection, the control section 301 controls various kinds of sections provided in the paper sheet processing apparatus 300. The communication section 302 has a function for communicating with the image forming apparatus 100. The storage section 304 stores control programs and various kinds of setting data therein, and is used as a working area for executing the control programs. The insertion path selecting section 305 selects an insertion path through which the insertion paper sheet is to be inserted. The ejection path selecting section 306 selects an ejection path through which a bunch of post-processed paper sheets is to be ejected. The conveyance section 310 conveys the paper sheet at a predetermined velocity. The jam detecting section 315 detects a paper jam by employing sensors respectively disposed at various positions within the paper sheet processing apparatus 300. The paper sheet inserting section 320 has a function for inserting an insertion paper sheet, accommodated in a PI (Paper Inserter) section, into the paper sheet conveyance path. The punching section 330 has a function for punching a binding hole in the paper sheet. The folding section 340 has a function for folding the paper sheet in half or three. The sub-tray ejecting section 390S has a function for ejecting the paper sheet onto the sub-tray serving as an ejecting destination thereof.

The paper sheet processing apparatus 400 is coupled to the paper sheet processing apparatus 300 as a successive stage of the paper sheet processing apparatus 300, and is provided with: a control section 401; a communication section 402; a storage section 404; an ejection path selecting section 406; a conveyance section 410; a jam detecting section 415; a folding section 440; a truing section 450; a saddle stitching section 460, a cutting section 480 and a sub-tray ejecting section 490S. In this connection, the paper sheets conveyed through the paper sheet processing apparatus 400 is conveyed out towards the paper sheet processing apparatus 500 serving as a successive stage thereof.

In this connection, the control section 401 controls various kinds of sections provided in the paper sheet processing apparatus 400. The communication section 402 has a function for communicating with the image forming apparatus 100, the paper sheet processing apparatus 300, etc. The storage section 404 stores control programs and various kinds of setting data therein, and is used as a working area for executing the control programs. The ejection path selecting section 406 selects an ejection path through which a bunch of post-processed paper sheets is to be ejected. The jam detecting section 415 detects a paper jam by employing sensors respectively disposed at various positions within the paper sheet processing apparatus 400. The folding section 440 has a function for folding the paper sheet in half or three. The truing section 450 has a function for truing a plurality of folded paper sheets. The saddle stitching section 460 has a function for applying a saddle stitching processing to a bunch of folded-and-trued paper sheets so as to stitch the bunch. The cutting section 480 has a function for trimming the edge portions of the bunch of saddle-stitched paper sheets. The sub-tray ejecting section 490S has a function for ejecting the paper sheet onto the sub-tray serving as an ejecting destination thereof.

The paper sheet processing apparatus 500 is coupled to the paper sheet processing apparatus 400 as a successive stage of the paper sheet processing apparatus 400, and is provided with: a control section 501; a communication section 502; a storage section 504; an ejection path selecting section 506; a conveyance section 510; a jam detecting section 515; a truing section 550; a side stitching section 560; a sub-tray ejecting section 590S; and a main-tray ejecting section 590M.

In this connection, the control section 501 controls various kinds of sections provided in the paper sheet processing apparatus 500. The communication section 502 has a function for communicating with the image forming apparatus 100, the paper sheet processing apparatus 400, etc. The storage section 504 stores control programs and various kinds of setting data therein, and is used as a working area for executing the control programs. The ejection path selecting section 506 selects an ejection path through which a bunch of post-processed paper sheets is to be ejected. The conveyance section 510 conveys the paper sheet at a predetermined velocity. The jam detecting section 515 detects a paper jam by employing sensors respectively disposed at various positions within the paper sheet processing apparatus 500. The truing section 550 has a function for truing a plurality of folded paper sheets. The side stitching section 560 has a function for applying a side stitching processing to a bunch of trued paper sheets so as to stitch the bunch. The sub-tray ejecting section 590S has a function for ejecting the paper sheet onto the sub-tray serving as an ejecting destination thereof. The main-tray ejecting section 590M has a function for ejecting the paper sheet onto the main-tray serving as an ejecting destination thereof.

Incidentally, each of the paper sheet processing functions or each of the structural constituents, provided in the paper sheet processing apparatuses 300 through 500, is indicated as merely an example. The scope of the present invention is not limited to them.

FIG. 3 shows a schematic diagram indicating an exemplified process that the paper sheets are conveyed within the image forming system. Herein, paper sheets p1~p3 are fed from the paper sheet feeding section 105. Further, insertion paper sheet p4 is fed from the paper sheet inserting section 320. Still further, paper sheets p5~p7 are fed from the paper sheet feeding section 105. Still further, insertion paper sheet p8 is fed from the paper sheet inserting section 220. Yet further, paper sheets p9~p11 are fed from the paper sheet feeding section 105.

In this connection, different from a normal paper sheet, sometimes, the insertion paper sheets p4 and p8, such as a pigment coated paper sheet, a gloss paper sheet, a lezac paper sheet, etc., may be very expensive. In addition, since the above-mentioned insertion paper sheet has not received any heat irradiated from the fixing section of the image forming apparatus 100, it can be reused.

<Operations>

Figure 4:
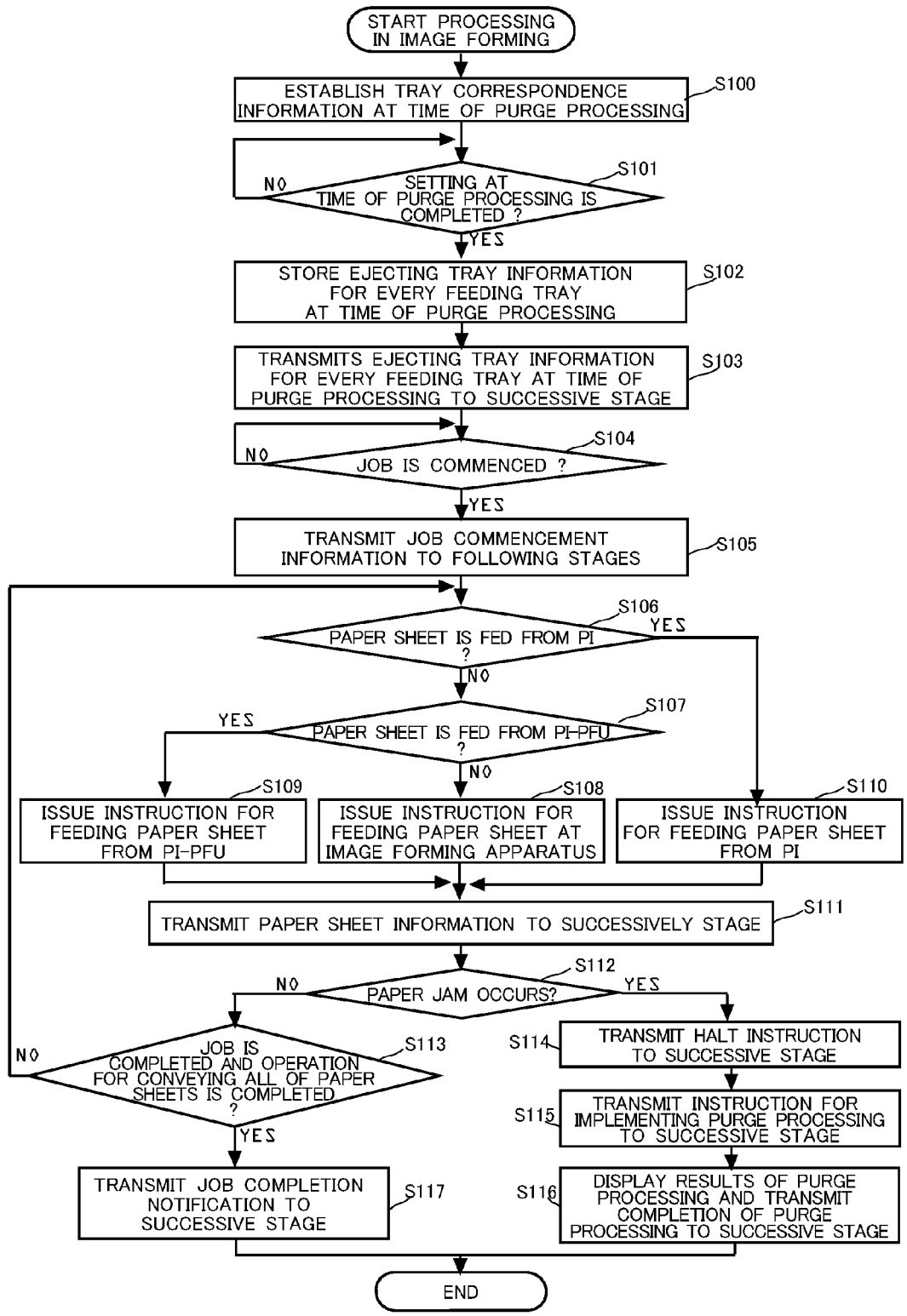
FIG. 4 is a flowchart showing a flow of image forming operations in accordance with an embodiment of the present invention.
Figure 5:
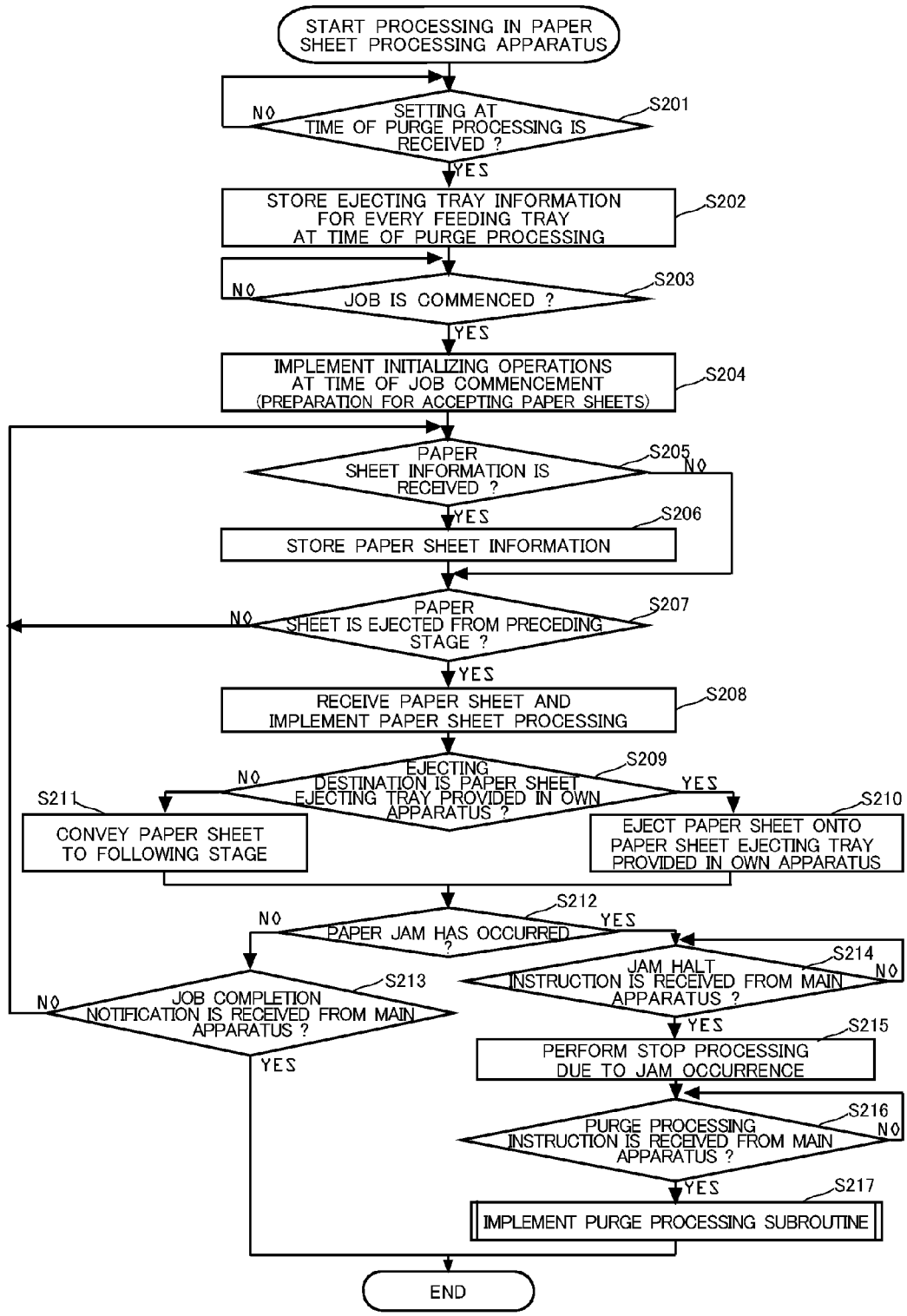
FIG. 5 is a flowchart showing a flow of image forming operations in accordance with an embodiment of the present invention.

Referring to the flowcharts and the sequence charts shown in FIG. 4 and the following drawings, an image forming system, a paper sheet processing apparatus and a paper sheet processing method, embodied in the present invention, will be detailed in the following according to the operating procedures thereof FIG. 4 is a flowchart showing a flow of fundamental operations to be conducted by the image forming apparatus embodied in the present invention. On the other hand, FIG. 5 is a flowchart showing a flow of fundamental operations to be conducted by the paper sheet processing apparatus embodied in the present invention. In the following, contrasting the flowcharts shown in FIG. 4 and FIG. 5 with each other, the operations to be conducted in both the image forming apparatus and the paper sheet processing apparatus will be detailed.

Initially, the control section 101 establishes tray correspondence information at the time of implementing purge processing (Step S100, shown in FIG. 4). In this connection, the tray correspondence information is determined in regard to correspondence relationships representing which paper sheet ejecting fray, among the paper sheet ejecting trays, a paper sheet fed from each of the paper sheet feeding trays is to be ejected onto, as the purge processing.

The control section 101 displays an operation display screen 103G onto the operation display section 103. At the time of implementing the purge processing, the control section 101 accepts the operator's inputting operation for establishing a corresponding one of the paper sheet ejecting trays, onto which a paper sheet fed from each of paper sheet feeding trays is to be ejected, through the operation display screen 103G.

In this connection, the scope of the above-inputting device is not limited to the operation display section 103. At the time of implementing the purge processing, it is also possible for the control section 101 to accept the operator's inputting operation for establishing a corresponding one of the paper sheet ejecting trays, onto which a paper sheet fed from each of paper sheet feeding trays is to be ejected, through another operating section (not shown in the drawings) for accepting various kinds of operator's operations.

Herein as shown in FIG. 7, in a tray correspondence setting screen 103Ga1 displayed within the operation display screen 103G, main body (image forming apparatus 100) paper-sheet feeding trays 1~3, PI-PFU (insertion paper-sheet inserting apparatus 200) paper-sheet feeding trays 1~2 and FNS1 (paper sheet processing apparatus 300) PI paper-sheet feeding trays 1~2 are displayed in the column of paper-sheet feeding tray side. While, as shown in FIG. 7, in a tray correspondence setting screen 103Ga1 displayed within the operation display screen 103G, FNS3 (paper sheet processing apparatus 500) trays 2 (sub-trays), FNS1 (paper sheet processing apparatus 300) trays 1 (sub-trays) and FNS2 (paper sheet processing apparatus 300) trays 1 (sub-trays) are displayed in the column of the paper sheet ejecting tray side.

At the time when the operator depresses an OK button 103Gb1 after the setting operations performed by the operator on the tray correspondence setting screen 103Ga1, displayed within the operation display screen 103G, have been completed, the control section 101 stores ejecting tray information for every paper sheet feeding tray (refer to FIG. 8) into the storage section 104, etc., as the tray correspondence information at the time of implementing the purge processing (Step S102, shown in FIG. 4).

Further, the control section 101 transmits tray correspondence information at the time of implementing the purge, processing (ejecting tray information for every paper sheet feeding tray (refer to FIG. 8)) to the insertion paper-sheet inserting apparatus 200, serving as the successive stage thereof, and the paper sheet processing apparatuses 300~500 (Step S103, shown in FIG. 4).

On the other hand, the insertion paper-sheet inserting apparatus 200, serving as the successive stage thereof, and the paper sheet processing apparatuses 300~500 wait arrival of tray correspondence information at the time of the purge processing, which is to be sent from the image forming apparatus 100, in a standby state (Step S201, shown in FIG. 5). In this connection, when receiving the tray correspondence information at the time of the purge processing, sent from the image forming apparatus 100 (Step S201, shown in FIG. 5; YES), the control sections 201-501 store the tray correspondence information at the time of the purge processing into the storage sections 204~504, respectively, (Step S202, shown in FIG. 5). The above-mentioned state is indicated as Phase "a" in the sequence chart shown in FIG. 9.

Successively, receiving an instruction for commencing a job in regard to an image forming operation from the operator, by depressing the start button provided in the operation display section 103, by issuing the instruction from an external personal computer, etc. (Step S104, shown in FIG. 4; YES), the control section 101 transmits job commencement information for declaring a commencement of the job to the insertion paper-sheet inserting apparatus 200 serving as the successive stage thereof and the paper sheet processing apparatuses 300~500 (Step S105, shown in FIG. 4). The above-mentioned state is indicated as Phase "b" in the sequence chart shown in FIG. 9.

The insertion paper-sheet inserting apparatus 200 and the paper sheet processing apparatuses 300~500 wait an arrival of the job commencement information, which is to be sent from the image forming apparatus 100, in a standby state (Step S203, shown in FIG. 5). Then, receiving the job commencement information sent from the image forming apparatus 100 (Step S203, shown in FIG. 5; YES), each of the control sections 201~501 implements predetermined initializing operations for initializing various kinds of sections in preparation for accepting paper sheets (Step S204, shown in FIG. 5).

At this time, referring to the job information in regard to the job to be implemented, the control section 101 sequentially determines a paper sheet feeding tray, from which the paper sheet is to be fed or inserted, in order of implementing the image forming operations (Step S106 and Step S107, shown in FIG. 4). When determining that the paper sheet is to be fed from the paper sheet feeding section 105 provided in the image forming apparatus 100 (Steps S106 and S107, shown in FIG. 4; NO), the control section 101 issues an instruction for feeding the paper sheet to the paper sheet feeding section 105 (Step S108, shown in FIG. 4). When determining that the paper sheet is to be inserted from the paper sheet inserting section 220 provided in the insertion paper-sheet inserting apparatus 200 (Step S106 and Step S107, shown in FIG. 4; NO and Yes, respectively), the control section 101 issues an instruction for feeding the paper sheet to the paper sheet inserting section 220 through the control section 201 (Step S109, shown in FIG. 4). When determining that the paper sheet is to be inserted from the paper sheet inserting section 320 provided in the paper sheet processing apparatus 300 (Steps S106, shown in FIG. 4; YES), the control section 101 issues an instruction for feeding the paper sheet to the paper sheet inserting section 320 through the control section 301 (Step S110, shown in FIG. 4).

Figures 10, 11:
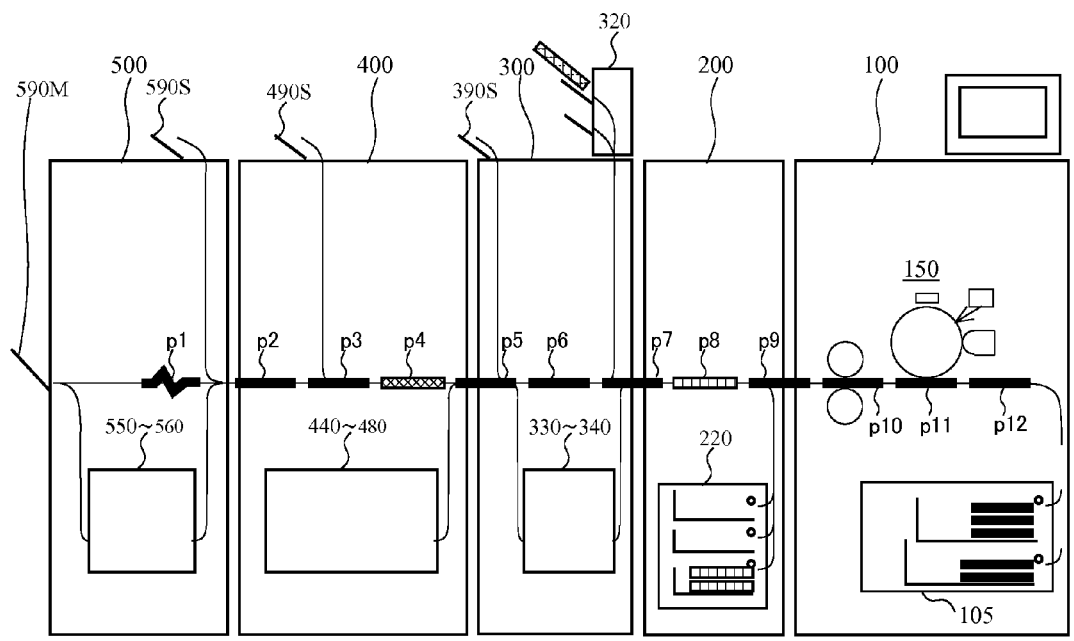
FIG. 10 is an explanatory schematic diagram indicating contents of data to be used in an image forming system in accordance with an embodiment of the present invention.
FIG. 11 is a schematic diagram showing a configuration and an operating status of an image forming system in accordance with an embodiment of the present invention.

Further, referring to paper sheet information, created in advance, in regard to a paper sheet available for feeding and/or inserting operation within the image forming system concerned, the control section 101 transmits the paper sheet information of the paper sheet to be fed or inserted (referring to the table shown in FIG. 10) to the insertion paper-sheet inserting apparatus 200, serving as the successive stage thereof, and the paper sheet processing apparatuses 300~500 (Step S111, shown in FIG. 4).

The paper sheet information above-mentioned includes: a paper sheet ID number; paper sheet size information; information of ejecting destination device in a normal operating state; information in regard to a paper sheet processing mode to be implemented; paper sheet tray information representing a paper sheet feeding tray from which the paper sheet is fed, etc.

Figure 9:
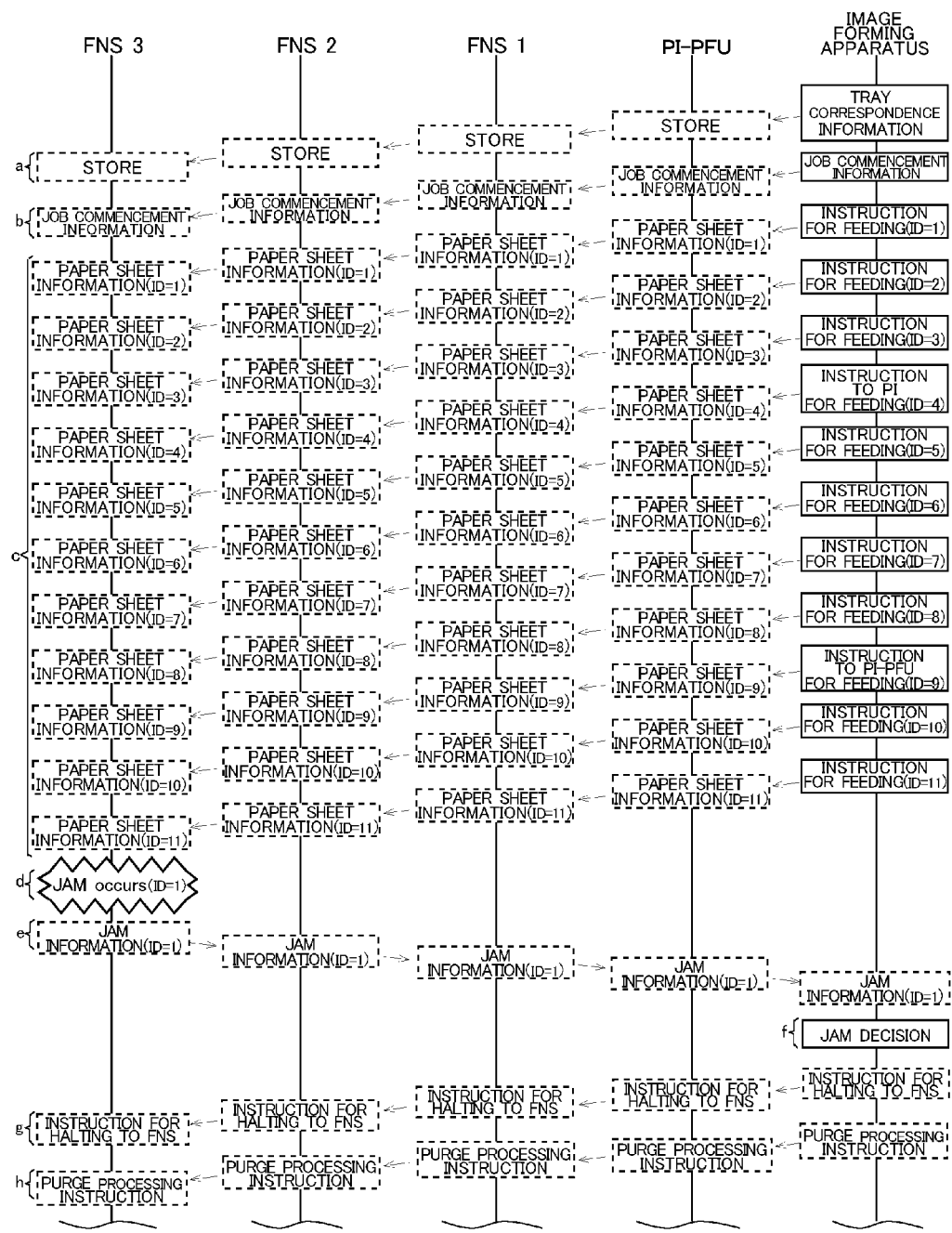
FIG. 9 is a sequence chart indicating operating statuses of an image forming system in accordance with an embodiment of the present invention.

On the other hand, the insertion paper-sheet inserting apparatus 200 and the paper sheet processing apparatuses 300-500 wait arrival of the paper sheet information, which is to be sent from the image forming apparatus 100, in a standby state (Step S205, shown in FIG. 5). Then, receiving the paper sheet information sent from the image forming apparatus 100 (Step S205, shown in FIG. 5; YES), the control sections 201~501 store the paper sheet information into the storage sections 204~501, respectively (Step S206, shown in FIG. 5). The above-mentioned state is indicated as Phase "c" in the sequence chart shown in FIG. 9. Herein, Phase "c" of the sequence chart shown in FIG. 9 represents such a state that the paper sheet information, in regard to all of 11 paper sheets having paper sheet IDs 1 through 11, has been transmitted.

In this connection, unless an occurrence of a paper jam is detected (Step S112, shown in FIG. 4; NO), the sequential process of feeding a paper sheet, forming an image and inserting an insertion paper sheet, is repeated with respect to all of the paper sheets onto which images should be formed as the job (Step S113, shown in FIG. 4).

Herein, if the paper sheet is ejected from the image forming apparatus 100 or the preceding apparatus (Step S207, shown in FIG. 5), each of the insertion paper-sheet inserting apparatus 200 serving as the successive stage and the paper sheet processing apparatuses 300~500 receives the paper sheet ejected from the preceding apparatus and implements the paper sheet processing designated by the paper sheet information (Step S208, shown in FIG. 5). Incidentally, since the paper sheet processing above-mentioned is one of generally well known processing, the detailed explanation for them will be omitted hereinafter.

Further, referring to the paper sheet information, each of the paper sheet processing apparatuses 300~500 determines whether the ejecting destination apparatus is set at the own apparatus or the following apparatus serving as a next stage thereof (Step S209, shown in FIG. 5). Then, when determining that the ejecting destination apparatus is set at the own apparatus (Step S209, shown in FIG. 5; YES), each of the paper sheet processing apparatuses 300~500 ejects the paper sheet onto the paper sheet ejecting tray provided in the own apparatus (Step S210, shown in FIG. 5). On the other hand, when determining that the ejecting destination apparatus is set at the following apparatus (Step S209, shown in FIG. 5; NO), each of the paper sheet processing apparatuses 300~500 conveys the paper sheet to the following apparatus (Step S211, shown in FIG. 5).

Successively, unless an occurrence of a paper jam is detected (Step S212, shown in FIG. 5; NO), with respect to all of the paper sheets onto which images should be formed as the job, each of the paper sheet processing apparatuses 300~500 repeats the sequential process of applying the paper sheet processing above-mentioned (Step S208, shown in FIG. 5) to the paper sheet concerned and ejecting the processed paper sheet (Step S210 or S211, shown in FIG. 5), until the job completion notification is sent from the image forming apparatus 100 (Step S213, shown in FIG. 5).

In this connection, the sequence chart shown in FIG. 9 mainly indicates the information transmitting and receiving processes. Accordingly, the paper sheet conveyance operation and the paper sheet processing may be implemented in a delayed fashion from the information transmitting and receiving operations.

Herein, as shown in FIG. 3, it is assumed that, corresponding to the paper sheet information of Phase "c" shown in FIG. 9, total 12 sheets of paper sheets p1~p12 are currently conveyed. In this situation, at the time when the leading paper sheet p1 (ID=1) is jammed within the paper sheet processing apparatus 500, the jam detecting section 515 detects the jam occurrence as a paper jam (Phase "d" shown in FIG. 9, paper sheet p1 shown in FIG. 11).

In this case, receiving the detected result from the jam detecting section 515, the control section 501 notifies the preceding apparatuses, including the paper sheet processing apparatus 400, the paper sheet processing apparatus 300, the insertion paper-sheet inserting apparatus 200 and the image forming apparatus 100, of information in regard to the paper sheet ID=1 and the jam occurrence position as the paper jam information (Phase "e" shown in FIG. 9).

Receiving the paper jam information concerned, the control section 101 transmits the halt instruction for halting the implementations of various kinds of processing and conveyance operations to the insertion paper-sheet inserting apparatus 200 serving as the successive stage of the image forming apparatus 100 and the paper sheet processing apparatuses 300~500 (Step S114 shown in FIG. 4, Phase "f" and Phase "g" shown in FIG. 9).

On the other hand, each of the insertion paper-sheet inserting apparatus 200 serving as the successive stage of the image forming apparatus 100 and the paper sheet processing apparatuses 300~500 periodically monitors an arrival of the jam halt instruction to be sent from the image forming apparatus 100 (Step S212 and Step S214, shown in FIG. 5). Then, receiving the jam halt instruction sent from the image forming apparatus 100 (Step S214, shown in FIG. 5; YES), the control sections 201~501 immediately make the paper sheets, currently conveyed therein, stop, respectively (Step S215, shown in FIG. 5). In this connection, it is also applicable that, after the processing, which is currently implemented in each of insertion paper-sheet inserting apparatus 200 and the paper sheet processing apparatuses 300~500, has been completed, the paper sheets, currently conveyed therein, are made to stop to such an extent that the preceding and following paper sheets do not collide with each other.

Further, after transmitting the halt instruction at the time of the paper jam occurrence, the control section 101 further transmits a purge processing instruction for implementing the purge processing to the insertion paper-sheet inserting apparatus 200 serving as the successive stage thereof and the paper sheet processing apparatuses 300~500 (Step S115 shown in FIG. 4, Phase "h" shown in FIG. 9)

On the other hand, in the insertion paper-sheet inserting apparatus 200 serving as the successive stage and the paper sheet processing apparatuses 300~500, receiving the purge processing instruction sent from the image forming apparatus 100 (Step S216, shown in FIG. 5; YES), the control sections 201~501 respectively implement the purge processing based on the fray correspondence information, therein (Step S217, shown in FIG. 5).

Referring to the flowchart shown in FIG. 6 and the sequence chart shown in FIG. 12, the subroutine of the purge processing to be performed in each of the apparatuses (Step S217, shown in FIG. 5) will be detailed in the following Based on the halt instruction issued at the time of the jam occurrence, each of the control sections 201~501, respectively provided in the insertion paper-sheet inserting apparatus 200 and the paper sheet processing apparatuses 300~500, determines whether or not a retention paper sheet exists within the own apparatus, from the detection results detected by the sensors (not shown in the drawings) disposed at various kinds of positions therein (Step S301, shown in FIG. 6).

Figure 6:
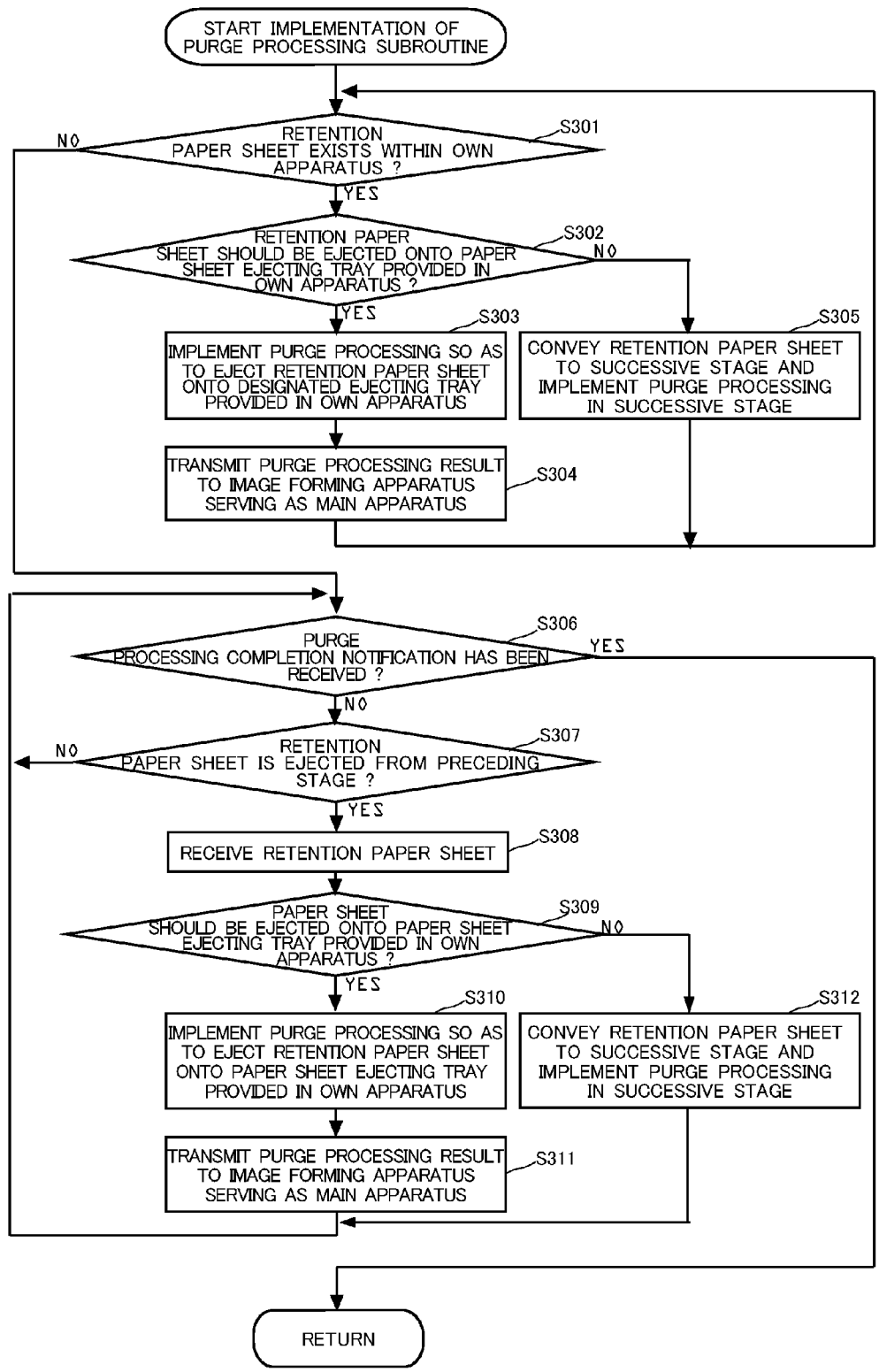
FIG. 6 is a flowchart showing a flow of image forming operations in accordance with an embodiment of the present invention.

When determining that a retention paper sheet exists within the own apparatus (Step S301, shown in FIG. 6; YES), the control sections 201~501 respectively determine whether or not the retention paper sheet should be ejected onto the paper sheet ejecting tray provided in the own apparatus, based on the paper sheet information and the tray correspondence information at the time of implementing the purge processing, both respectively stored in the storage section 204~504 (Step S302, shown in FIG. 6). In this connection, concretely speaking, with respect to the retention paper sheet concerned, each of the control sections 201~501 identifies a paper sheet feeding tray by the paper sheet information (shown in FIG. 10), and then, determines an paper sheet ejecting tray corresponding to the paper sheet feeding tray above-identified from the tray correspondence information at the time of implementing the purge processing (shown in FIG. 8).

When determining that the retention paper sheet should not be ejected onto the paper sheet ejecting tray provided in the own apparatus (Step S302, shown in FIG. 6; NO), the control sections 201~501 control the conveyance sections 210~410, respectively, so as to convey the retention paper sheet towards the paper sheet processing apparatus serving as the successive stage thereof (Step S305, shown in FIG. 6).

On the other hand, when determining that the existing retention paper sheet should be ejected onto the paper sheet ejecting tray provided in the own apparatus (Step S302, shown in FIG. 6; YES), based on the tray correspondence information at the time of implementing the purge processing, the control sections 201~501 control the ejection path selecting sections 306~506, the sub-tray ejecting sections 390S~590S, etc., respectively, so as to eject the retention paper sheet onto the paper sheet ejecting tray provided in the own apparatus (Step S303, shown in FIG. 6). Then, any one of the control sections 201~501, which has ejected the retention paper sheet onto the paper sheet ejecting tray provided in the own apparatus, notifies the control section 101 of the ejecting result (success or failure of the ejecting operation) (Step S304, shown in FIG. 6).

In this connection, each of the control sections 201~501 confirms whether or not the purge processing completion notification has been received from the control section 101 (Step S306, shown in FIG. 6), and then, when confirming that the purge processing completion notification has been received from the control section 101 (Step S306, shown in FIG. 6; YES), finalizes the subroutine in regard to the purge processing concerned (RETURN, shown in FIG. 6).

On the other hand, when confirming that the purge processing completion notification has not been received from the control section 101 (Step S306, shown in FIG. 6; NO), each of the control sections 201~501 waits and confirms whether or not the paper sheet is conveyed to the own apparatus from the former apparatus serving as the preceding stage thereof. In this connection, the above-mentioned operation for waiting and confirming the paper sheet to be conveyed from the preceding stage is continued until the purge processing completion notification is received from the control section 101 (Step S306 and Step S307, shown in FIG. 6).

When confirming that the paper sheet is conveyed to the own apparatus from the former apparatus above-mentioned (Step S307, shown in FIG. 6; YES), each of the control sections 201~501 receives and conveys the paper sheet concerned within the own apparatus (Step S308, shown in FIG. 6), and determines whether or not the paper sheet concerned should be ejected onto the paper sheet ejecting tray provided in the own apparatus, based on the paper sheet information and the tray correspondence information at the time of implementing the purge processing, both respectively stored in the storage section 204~504 (Step S309, shown in FIG. 6). In this connection, with respect to the paper sheet conveyed from the preceding stage, each of the control sections 201~501 identifies a paper sheet feeding tray by the paper sheet information (shown in FIG. 10), and then, determines a paper sheet ejecting tray corresponding to the paper sheet feeding tray above-identified from the tray correspondence information at the time of implementing the purge processing (shown in FIG. 8).

When determining that the paper sheet conveyed from the preceding stage should not be ejected onto the paper sheet ejecting tray provided in the own apparatus (Step S309, shown in FIG. 6; NO), the control sections 201~501 control the conveyance sections 210~410, respectively, so as to convey the paper sheet concerned towards the paper sheet processing apparatus serving as the successive stage thereof (Step S312, shown in FIG. 6).

On the other hand, when determining that the paper sheet conveyed from the preceding stage should be ejected onto the paper sheet ejecting tray provided in the own apparatus (Step S309, shown in FIG. 6; YES), based on the tray conespondence information at the time of implementing the purge processing, the control sections 201~501 control the ejection path selecting sections 306~506, the sub-tray ejecting sections 390S~590S, etc., respectively, so as to eject the retention paper sheet onto the paper sheet ejecting tray provided in the own apparatus (Step S310, shown in FIG. 6). Then, any one of the control sections 201~501, which has ejected the retention paper sheet onto the paper sheet ejecting tray provided in the own apparatus, notifies the control section 101 of the ejecting result (success or failure of the ejecting operation) (Step S304, shown in FIG. 6).

Successively, until receiving the purge processing completion notification sent from the control section 101, each of the control sections 201~501 repeats the above-mentioned processing, and at the time when receiving the purge processing completion notification from the control section 101 (Step S306, shown in FIG. 6; YES), finalizes the subroutine in regard to the purge processing concerned (RETURN, shown in FIG. 6).

Figure 12:
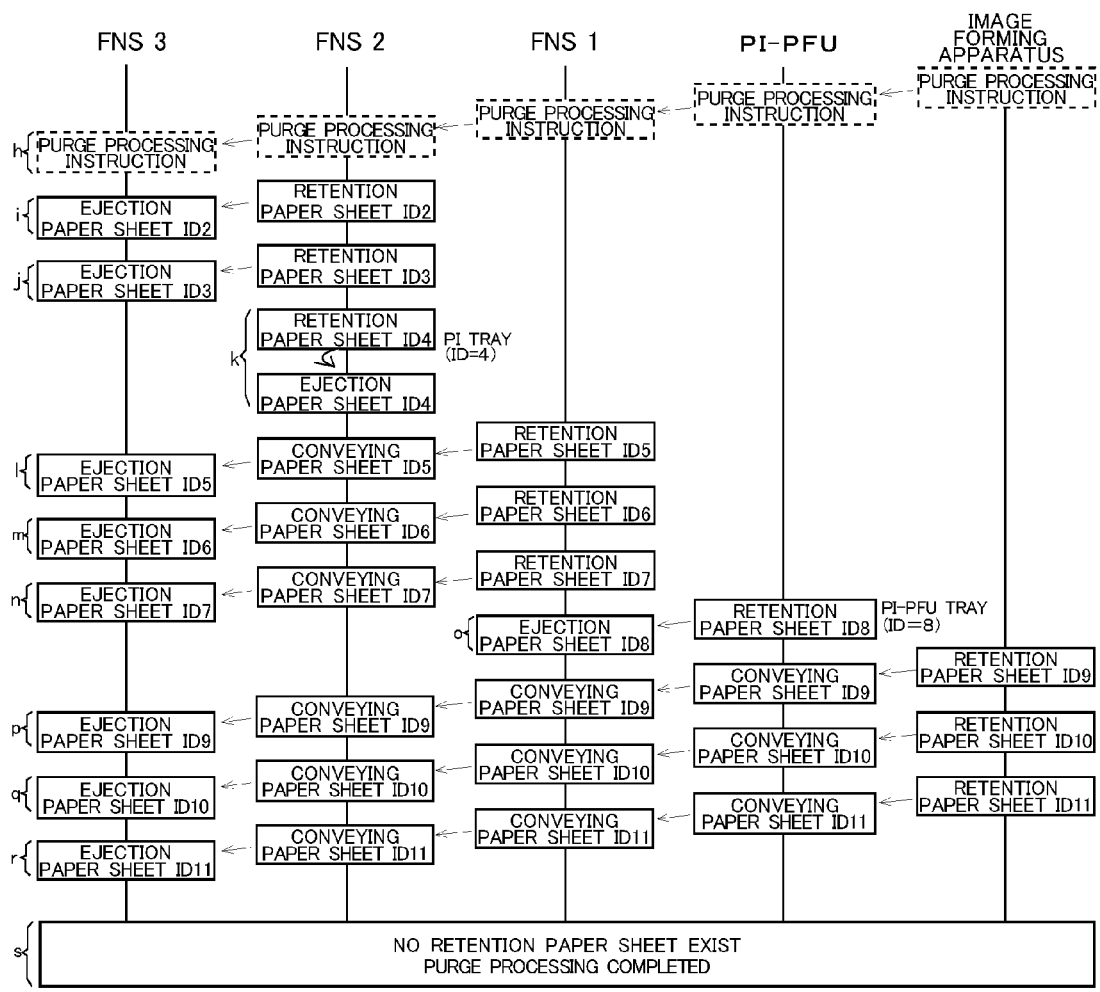
FIG. 12 is a sequence chart indicating operating statuses of an image forming system in accordance with an embodiment of the present invention.

The sequence chart shown in FIG. 12, indicates Phase "h", which is also shown in FIG. 9, and following Phases "i" through "r". In other words, both Phase "h" shown in FIG. 9 and Phase "h" shown in FIG. 12 represent the same phase. According to the sequence chart shown in FIG. 12, the paper sheets, respectively having paper sheet IDs=2 and 3, have been fed at the image forming apparatus 100, and then, remain as the retention paper sheets within the paper sheet processing apparatus 400, and successively, based on the tray correspondence information at the time of implementing the purge processing, the paper sheets concerned are to be ejected onto the paper sheet ejecting tray provided in the paper sheet processing apparatus 500 (Phase "i" and Phase "j", shown in FIG. 12).

The paper sheet, having paper sheet ID=4, is the insertion paper sheet fed from the paper sheet inserting section 320, and then, remains as the retention paper sheet within the paper sheet processing apparatus 400. Namely, based on the tray correspondence information at the time of implementing the purge processing, the paper sheet, having paper sheet ID=4, is to be ejected onto the paper sheet ejecting tray provided in the paper sheet processing apparatus 400, separately from the other paper sheets (Phase "k", shown in FIG. 12).

The paper sheets, respectively having paper sheet IDs=5, 6 and 7, have been fed at the image forming apparatus 100, and then, remain as the retention paper sheets within the paper sheet processing apparatus 300, and successively, based on the tray correspondence information at the time of implementing the purge processing, the paper sheets concerned are to be ejected onto the paper sheet ejecting tray provided in the paper sheet processing apparatus 500 (Phase "1", Phase "m" and Phase "n", shown in FIG. 12).

The paper sheet, having paper sheet ID=8, is the insertion paper sheet fed from the paper sheet inserting section 220, and then, remains as the retention paper sheet within the insertion paper-sheet inserting apparatus 200, and accordingly, based on the tray correspondence information at the time of implementing the purge processing, the paper sheet concerned is to be ejected onto the paper sheet ejecting tray provided in the paper sheet processing apparatus 300, separately from the other paper sheets (Phase "o", shown in FIG. 12).

Figure 13:
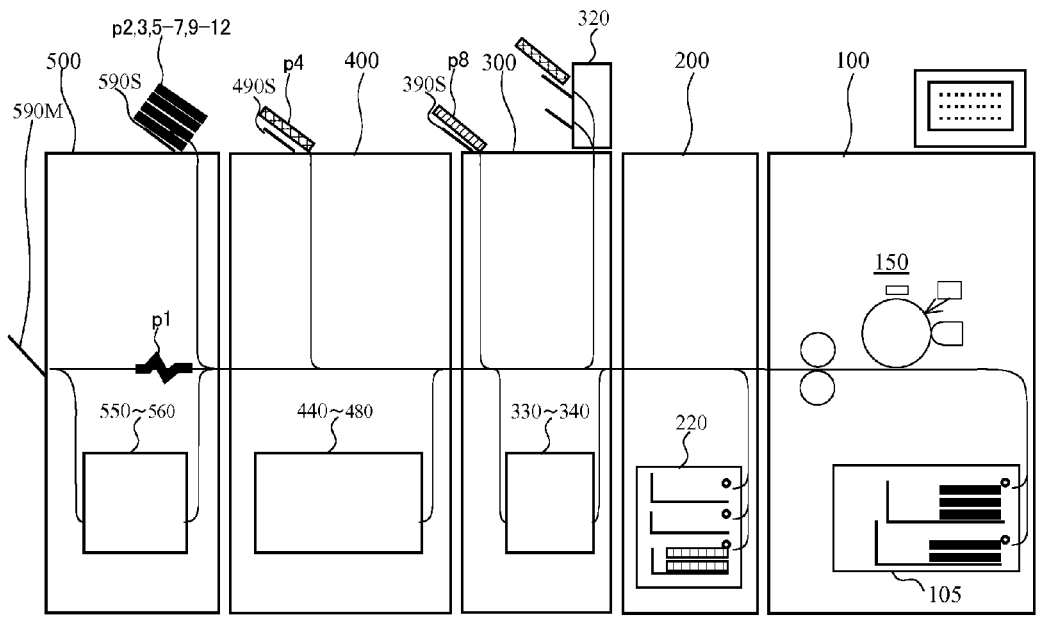
FIG. 13 is a schematic diagram showing a configuration and an operating status of an image forming system in accordance with an embodiment of the present invention.

The paper sheets, respectively having paper sheet IDs=9, 10 and 11, have been fed at the image forming apparatus 100, and then, remain as the retention paper sheets within the image forming apparatus 100. Namely, based on the tray correspondence information at the time of implementing the purge processing, the paper sheets, having paper sheet IDs=9, 10 and 11, are to be ejected onto the paper sheet ejecting tray provided in the paper sheet processing apparatus 500 (Phase "p", Phase "q" and Phase "f", shown in FIG. 12). The side view of the concerned apparatuses, shown in FIG. 13, represents the state of the system, in which the retention paper sheets have been ejected in a manner as described in the foregoing.

Successively, the control section 101 receives results of the purge processing, transmitted from the control sections 201~501 of the insertion paper-sheet inserting apparatus 200 serving as the successive stage thereof and the paper sheet processing apparatuses 300~500 (Step S304 and Step S311, shown in FIG. 6), so as to display the results of the purge processing, performed in a manner as aforementioned by the insertion paper-sheet inserting apparatus 200 serving as the successive stage and the paper sheet processing apparatuses 300~500, onto the operation display section 103 (Step S116, shown in FIG. 4).

Figure 14:
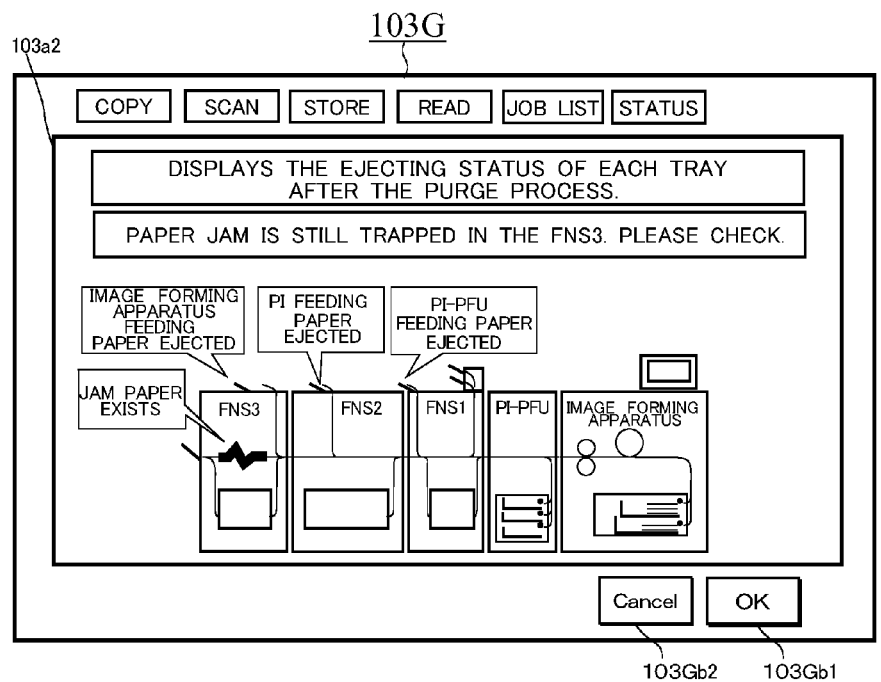
FIG. 14 is an explanatory schematic diagram indicating a screen display of an image forming system in accordance with an embodiment of the present invention.

Still successively, the control section 101 receives results of the purge processing, transmitted from the control sections 201~501 of the insertion paper-sheet inserting apparatus 200 serving as the successive stage thereof and the paper sheet processing apparatuses 300~500 (Step S304 and Step S311, shown in FIG. 6), so as to display the results of the purge processing, performed in a manner as aforementioned by the insertion paper-sheet inserting apparatus 200 serving as the successive stage and the paper sheet processing apparatuses 300~500, onto the operation display section 103 as shown in FIG. 14 (Step S116, shown in FIG. 4).

As shown in FIG. 14, the appearance of the image forming system, and concurrently, the current status of the paper sheet ejecting trays, representing which paper sheet ejecting trays the paper sheets, fed from the paper sheet feeding trays, and the insertion paper sheets have been ejected onto, respectively, are displayed as a purge processing result screen 103Ga2 within the operation display screen 103G in the operation display section 103. In this connection, although a graphical display method is employed herein, a text display method in a list form may be also applicable for this purpose. Further, in the exemplified schematic diagram shown in FIG. 14, not only the paper sheets ejected by the purge processing, but also the position of the jammed paper sheet, currently remaining due to the paper jam occurrence, are displayed together.

In this connection, in a case where the purge processing has been implemented correctly in conformity with the tray correspondence information at the time of implementing the purge processing, or even in such a case where the purge processing has been implemented without appropriately coping with the tray correspondence information at the time of implementing the purge processing, it is desirable that, referring to the purge processing result information sent from the insertion paper-sheet inserting apparatus 200 serving as the successive stage and the paper sheet processing apparatuses 300~500, the control section 101 displays the results thereof in a manner of a list form as shown in FIG. 14, so as to notify the operator of them.

Herein, the case where the purge processing has been implemented without appropriately coping with the tray correspondence information at the time of implementing the purge processing, is defined as such a case that the retention paper sheet has remained at an incorrect position exceeding the position of the paper sheet ejecting tray designated as the ejecting destination thereof, or the like, and as an exceptional processing, the retention paper sheet concerned is ejected onto any one of the paper sheet ejecting trays disposed at a downstream side of the incorrect position thereof.

Further, at the time when determining that the processing to be applied to all of the retention paper sheets have been completed, the control section 101 transmits the purge processing completion notification to the control sections 201~501 (Step S116, shown in FIG. 4). Receiving the purge processing completion notification above-mentioned, each of the control sections 201~501, respectively provided in the insertion paper-sheet inserting apparatus 200 serving as the successive stage and the paper sheet processing apparatuses 300~500, finalizes the purge processing (Phase "s", shown in FIG. 12).

In the embodiment described in the foregoing, at the time when a paper jam occurs at any one of various positions within the image forming system, on an occasion that the purge processing for collecting the retention paper sheets currently remaining within the image forming system to eject the collected retention paper sheets onto the paper sheet ejecting trays, is implemented, based on the tray correspondence information at the time of implementing the purge processing and the paper sheet information representing from which paper sheet feeding tray, among the paper sheet feeding trays, each of the retention paper sheets is fed, the ejecting sections are controlled so as to respectively eject the retention paper sheets onto the paper sheet ejecting trays in such a manner that a specific retention paper sheet among the retention paper sheets, which is fed from the specific paper sheet feeding tray (for instance, the paper sheet inserting section 220 or the paper sheet inserting section 320), and a retention paper sheet among the retention paper sheets, which is fed from the paper sheet feeding tray other than the specific paper sheet feeding tray established in advance (for instance, the paper sheet feeding section 105, etc.), are separated from each other. Accordingly, in the state that the purge processing has been completed, it becomes possible to handle the specific paper sheet fed from the specific paper-sheet ejecting tray, separately from the paper sheet fed from the other paper sheet ejecting tray.

Further, by setting the insertion-use paper-sheet feeding tray (for instance, the paper sheet inserting section 220 or the paper sheet inserting section 320), located at a downstream position from the image forming apparatus 100, as the specific paper-sheet feeding tray, in the state that the purge processing has been completed, it becomes possible to handle a paper sheet suffered from no influence of the heat generated in the fixing operation, separately from the paper sheet fed from the other paper sheet ejecting tray.

Still further, with respect to the insertion paper sheet, etc., by setting the paper sheet feeding tray designated in advance as the specific paper-sheet feeding tray, in the state that the purge processing has been completed, it becomes possible to handle a paper sheet fed from the paper sheet feeding tray designated, separately from the paper sheet fed from the other paper sheet feeding tray.

Still further, in a case where a plurality of specific paper-sheet feeding trays exists as in the case that the paper sheet inserting section 220 and the paper sheet inserting section 320 coexist, by separating the retention paper sheets, respectively fed from the plurality of specific paper-sheet feeding trays, from each other, and then ejecting them, in the state that the purge processing has been completed, it becomes possible to handle the paper sheets fed from the plurality of specific paper-sheet feeding trays, separately from the other paper sheets fed from the other paper-sheet feeding trays, and it also becomes possible to handle each of them independently.

Still further, in the embodiment described in the foregoing, a concrete example, in which the retention paper sheets, fed from the paper sheet feeding section 105 of the image forming apparatus 100, are ejected onto a single place in a lump, has been detailed. However, in a case where a plurality of paper sheet feeding trays other than the specific paper-sheet feeding fray (paper sheet feeding trays provided in the paper sheet feeding section 105) exists, by collectively ejecting the retention paper sheets, fed from the plurality of paper sheet feeding trays other than the specific paper sheet feeding trays, in a lump, in the state that the purge processing has been completed, it becomes possible to handle the paper sheets, fed from the plurality of specific paper-sheet feeding frays, separately from the other paper sheets fed from the other paper sheet feeding trays, and it also becomes possible to collectively handle the other paper sheets, fed from the other paper sheet feeding trays, in a lump.

Still further, in such a case that, even when the ejecting section has been controlled so as to separate the retention paper sheets, respectively fed from the plurality of specific paper-sheet feeding trays, from each other to eject them, there exist plural paper sheet ejecting trays not to be used for the separation ejecting operation in regard to the specific paper sheet feeding trays, the retention paper sheets, fed from the paper sheet feeding trays other than the specific paper-sheet feeding trays (paper sheet feeding trays provided in the paper sheet feeding section 105, etc.), are separated from each other, and then, ejected, corresponding to the current status of the image forming operation in regard to each of the paper sheets. As a result, in the state that the purge processing has been completed, this will allows the operator to handle the paper sheets, fed from the plurality of specific paper-sheet feeding trays, separately from the other paper sheets fed from the other paper sheet feeding frays, and it also becomes possible to handle the other paper sheets, fed from the other paper sheet feeding trays, by separating them corresponding to the current status of the image forming operation for each of them.

Still further, on an occasion that the retention paper sheets are separated, and then, ejected, since the operation display section 103 is controlled so as to display the corresponding relationship between the paper sheet ejecting trays and the retention paper sheets, representing which one of the paper sheet ejecting trays each of the retention paper sheets has been ejected onto, as shown in FIG. 14, in the purge processing, it becomes possible to handle the paper sheets, fed from the plurality of specific paper-sheet feeding trays, separately from the other paper sheets fed from the other paper sheet feeding tray, and it also becomes possible to clearly recognize which one of the paper sheet ejecting trays each of the retention paper sheets has been ejected onto.

Still further, it is possible to display the screen of the separation ejecting operation as indicated in the schematic diagram shown in FIG. 14, not only after the purge processing has been completed, but also in the midcourse of implementing the purge processing in such a manner that the phases of "SCHEDULING SEPARATION EJECTING OPERATION", "RUNNING SEPARATION EJECTING OPERATION" and "COMPLETING SEPARATION EJECTING OPERATION" are sequentially displayed thereon. Accordingly, it becomes possible to handle the paper sheets, fed from the plurality of specific paper-sheet feeding tray, separately from the other paper sheets fed from the other paper sheet feeding trays, and it also becomes possible to clearly recognize which one of the paper sheet ejecting trays each of the retention paper sheets has been ejected onto.

Still further, in the case where it has been impossible to appropriately cope with the tray correspondence information established in advance, it is desirable that the indication of the separation ejecting operation in the schematic diagram shown in FIG. 14 is displayed as an error indication. In this case, it is also desirable that the error indication is displayed by contrasting the schedule of separation ejecting operation with the result of the separation ejecting operation.

Yet further, by accepting the corresponding relationship, representing which one of the paper sheet ejecting trays each of the retention paper sheets is to be ejected onto, through the operation display section 103, it becomes possible to reflect the intention of the user onto the handling operation for ejecting the retention paper sheets.

Other Embodiment (1)

Referring to drawings, an embodiment of the present invention has been described in the foregoing, the scope of concrete configurations and numerical values, embodied in the present invention, is not limited to those indicated by the exemplified embodiment. Modifications and additions, made by a skilled person without departing from the spirit and scope of the invention, shall be included in the scope of the present invention.

Although, according to the embodiment described in the foregoing, the control section 101, provided in the image forming apparatus 100, plays a center role in controlling the purge processing, the scope of the present invention is not limited to the above.

For instance, it is also applicable that any one of the control sections 201~501 respectively provided in the insertion paper-sheet inserting apparatus 200 and the paper sheet processing apparatuses 300~500, other than the image forming apparatus 100, issues an instruction for implementing the operation for controlling the purge processing above-mentioned to another one of them, so as to implement the purge processing same as the above-mentioned.

In this case, when the apparatus, other than the image forming apparatus 100, that performs the purge processing, is provided with an operation display section, the operation display section concerned may be used. On the other hand, when the apparatus concerned is not provided with an operation display section, it is applicable that the apparatus concerned transmits the information to the image forming apparatus 100 so that the operations for accepting the settings and displaying the results are implemented by using the operation display section 103 provided in the image forming apparatus 100.

Further, although the operation display section 103 has been exemplified as the integral configuration of the operating section and the displaying section in the foregoing, it is also possible to configure the operating section and the displaying section separately.

Still further, it is possible to provide the operating section and the displaying section not only in the image forming apparatus 100, but also in any one of the paper sheet processing apparatuses.

Still further, according to the aforementioned explanations for the embodiment, with respect to the retention paper sheet, each of the control sections identifies a paper sheet feeding tray by the paper sheet information, and then, determines a paper sheet ejecting tray corresponding to the paper sheet feeding fray above-identified, based on the tray correspondence information at the time of implementing the purge processing. However, the scope of the present invention is not limited to the above. For instance, it is also applicable that the paper sheet information of each of the paper sheets includes information of the paper sheet ejecting tray at the time of implementing the purge processing.

Still further, in a case where the operator does not establish the tray correspondence information at the time of implementing the purge processing, it is also applicable that the control section 101 automatically determines the tray correspondence information at the time of implementing the purge processing.

Alternatively, in a case where the operator does not establish the tray correspondence information at the time of implementing the purge processing, or in a case where it is impossible to implement the operation in conformity with the tray correspondence information at the time of implementing the purge processing due to a certain relation with the position of the paper jam occurrence, it is also applicable that the control section 101 automatically determines the tray correspondence information at the time of implementing the purge processing, based on the information in regard to the vacant paper-sheet ejecting trays residing at the time of a paper jam occurrence.

Yet further, in the embodiment described in the foregoing, it is assumed that the retention paper sheets are generated due to the paper jam occurrence. However, the scope of the present invention is not limited to the above. For instance, it is also possible to apply the present invention to such a case that the retention paper sheets are generated due to the stoppage of the paper sheet conveyance operation in midcourse of implementing the image forming operation, caused by a malfunction of any one of the sections or parts provided in the image forming system (for instance, a malfunction of a motor or a failure of a gear for driving the conveyance rollers), an electric power failure, etc.

What is claimed is:

1. An image forming system comprising:
    a paper sheet feeding section that includes a plurality of paper sheet feeding trays respectively accommodating paper sheets therein;
    an image forming section that forms an image onto the paper sheet fed from the paper sheet feeding section;
    a paper sheet ejecting section that ejects the paper sheets onto a plurality of paper sheet ejecting trays; and
    a control section configured to control the paper sheet feeding section so as to feed the paper sheets to the image forming section from the paper sheet feeding section, to control the image forming section so as to form the image onto the paper sheet, and to control the paper sheet ejecting section to eject the paper sheet onto any one of the plurality of paper sheet ejecting trays of the paper sheet ejecting section;

wherein, when implementing a purge processing for collecting a retention paper sheet remaining within the image forming system and ejecting the collected retention paper sheet to the paper sheet ejecting tray, based on paper sheet information regarding the paper sheet feeding tray from which each of the retention paper sheets is fed, the control section is configured to control the paper sheet ejecting section so as to eject the retention paper sheets onto the plurality of paper sheet ejecting trays, in such a manner that a first retention paper sheet fed from a specific paper-sheet feeding tray is ejected separately from a second retention paper sheet fed from a paper sheet feeding tray other than the specific paper-sheet feeding tray.

2. The image forming system as recited in claim 1, wherein the control section controls the paper sheet ejecting section so as to eject the first retention paper separately from the second retention paper based on tray correspondence information regarding tray correspondence relationship in the purge processing between the paper sheet feeding tray and the paper sheet ejecting tray.

3. The image forming system as recited in claim 1, wherein the specific paper-sheet feeding tray is an insertion paper-sheet feeding tray located at a position downstream from the image forming section with respect to a paper sheet transporting direction.

4. The image forming system as recited in claim 1, wherein the specific paper-sheet feeding tray is designated in advance by the tray correspondence information.

5. The image forming system as recited in claim 1, wherein, when a plurality of specific paper-sheet feeding trays exists, the control section controls the paper sheet ejecting section so that the retention paper sheets fed respectively from the plurality of specific paper-sheet feeding trays are separately ejected.

6. The image forming system as recited in claim 1, wherein, when a plurality of paper-sheet feeding trays other than the specific paper-sheet feeding tray exist, the control section controls the paper sheet ejecting section so that the retention paper sheets fed from the plurality of paper-sheet feeding trays other than the specific paper-sheet feeding tray are collectively ejected in a lump.

7. The image forming system as recited in claim 1, wherein, in a case that there exist plural paper sheet ejecting trays not to be used for separation and ejection with regard to the specific paper-sheet feeding trays even if controlling the paper sheet ejecting section so as to separate retention paper sheets fed from the specific paper-sheet feeding tray to eject them, the control section controls the paper sheet ejecting section so that the retention paper sheets fed from the paper sheet feeding trays other than the specific paper-sheet feeding trays are separated and ejected, corresponding to a status of an image forming operation with regard to each of the paper sheets.

8. The image forming system as recited in claim 1, further comprising:
a display section that displays various kinds of screens thereon, based on controlling operations conducted by the control section; and
wherein, when separating the retention paper sheets and ejecting the retention paper sheets, the control section controls the display section so as to display a correspondence relationship representing the paper sheet ejecting tray onto which each of the retention paper sheets is to be ejected.

9. The image forming system as recited in claim 1, further comprising:
a display section that displays various kinds of screens thereon, based on controlling operations conducted by the control section; and
wherein the control section controls the display section so as to display a correspondence relationship screen representing the paper sheet ejecting tray onto which each of the retention paper sheets is to be ejected after the retention paper sheets has been ejected.

10. The image forming system as recited in claim 1, further comprising:
an operating section that accepts various kinds of settings and notifies the control section of the accepted settings; and
wherein the control section is capable of accepting a correspondence relationship representing the paper sheet rejecting tray onto which each of the retention paper sheet is to be ejected, through the operating section.

11. A paper sheet processing apparatus connectable to a paper sheet feeding section and an image forming section for constituting an image forming system, the paper feeding section that includes a plurality of paper sheet feeding trays respectively accommodating paper sheets therein and the image forming section that forms an image onto the paper sheet fed from the paper sheet feeding section, the paper sheet processing apparatus comprising:
an ejecting section that ejects the paper sheets onto a plurality of paper sheet ejecting trays; and
a control section configured to control the paper sheet ejecting section to eject the paper sheet onto any one of the plurality of paper sheet ejecting trays in the paper sheet ejecting section;
wherein, when implementing a purge processing for collecting a retention paper sheet remaining within the image forming system and ejecting the collected retention paper sheet to the paper sheet ejecting tray, based on paper sheet information regarding the paper sheet feeding tray from which each of the retention paper sheets is fed, the control section is configured to control the paper sheet ejecting section so as to eject the retention paper sheets onto the plurality of paper sheet ejecting trays, in such a manner that a first retention paper sheet fed from a specific paper-sheet feeding tray is ejected separately from a second retention paper sheet fed from a paper sheet feeding tray other than the specific paper-sheet feeding tray.

12. The paper sheet processing apparatus as recited in claim 11, wherein the control section controls the paper sheet ejecting section so as to eject the first retention paper separately from the second retention paper based on tray correspondence information regarding tray correspondence relationship in the purge processing between the paper sheet feeding tray and the paper sheet ejecting tray.

13. The paper sheet processing apparatus as recited in claim 11, wherein the specific paper-sheet feeding tray is an insertion paper-sheet feeding tray located at a position downstream from the image forming section and provided within the paper sheet processing apparatus.

14. The paper sheet processing apparatus as recited in claim 11, wherein the specific paper-sheet feeding tray is designated in advance by the tray correspondence information.

15. The paper sheet processing apparatus as recited in claim 11, wherein, when a plurality of specific paper-sheet feeding trays exist, the control section controls the paper sheet ejecting section so that the retention paper sheets respectively fed from the plurality of specific paper-sheet feeding tray are separately ejected.

16. The paper sheet processing apparatus as recited in claim 11, wherein, when a plurality of paper-sheet feeding trays other than the specific paper-sheet feeding tray exist, the control section controls the paper sheet ejecting section so that the retention paper sheets fed from the plurality of paper-sheet feeding trays other than the specific paper-sheet feeding tray are collectively ejected in a lump.

17. The paper sheet processing apparatus as recited in claim 11, wherein, in a case where there exist plural paper sheet ejecting trays not to be used for separation and ejection with regard to the specific paper-sheet feeding trays even if controlling the paper sheet ejecting section so as to separate retention paper sheets fed from the specific paper-sheet feeding tray to eject them, the control section controls the paper sheet ejecting section so that the retention paper sheets fed from the paper sheet feeding trays other than the specific paper-sheet feeding trays are separated and ejected, corresponding to a status of an image forming operation with regard to each of the paper sheets.

18. The paper sheet processing apparatus as recited in claim 11, wherein, when separating the retention paper sheets and ejecting the retention paper sheets, the control section notifies a display section disposed at any one of positions residing within the image forming system, of information a correspondence relationship representing the paper sheet ejecting tray onto which each of the retention paper sheets is to be ejected.

19. The paper sheet processing apparatus as recited in claim 11, wherein, after ejecting the retention paper sheets, the control section notifies a display section disposed at any one of positions residing within the image forming system, of information regarding a correspondence relationship representing the paper sheet ejecting tray onto which each of the retention paper sheets is to be ejected.

20. The paper sheet processing apparatus as recited in claim 11, wherein the control section is capable of accepting a correspondence relationship representing the paper sheet rejecting tray onto which each of the retention paper sheets is to be ejected through an operating section disposed at any one of positions residing within the image forming system.

* * * * *